United States Patent [19]

Weirich et al.

[11] Patent Number: 4,790,347
[45] Date of Patent: Dec. 13, 1988

[54] PRESSURE-RELIEF VALVE DEVICES

[75] Inventors: Walter Weirich; Werner Grommas, both of Dortmund, Fed. Rep. of Germany

[73] Assignee: Gewerkschaft Eisenhutte Westfalia GmbH, Lunen, Fed. Rep. of Germany

[21] Appl. No.: 116,299

[22] Filed: Nov. 4, 1987

[30] Foreign Application Priority Data

Nov. 6, 1986 [DE] Fed. Rep. of Germany ....... 3637888

[51] Int. Cl.$^4$ ............................................. F16K 17/04
[52] U.S. Cl. .................................. 137/484.2; 137/494; 507/538
[58] Field of Search ...................... 137/484.2, 494, 507, 137/538

[56] References Cited

U.S. PATENT DOCUMENTS

| | | | |
|---|---|---|---|
| 3,548,867 | 12/1970 | Grisebach | 137/494 |
| 4,274,435 | 6/1981 | Block | 137/538 X |
| 4,284,101 | 8/1981 | Weirich | 137/494 X |
| 4,552,172 | 11/1985 | Krieger | 137/538 X |
| 4,716,928 | 1/1988 | Kussel | 137/494 |

FOREIGN PATENT DOCUMENTS 1152242 9/1957 France ................. 137/538

Primary Examiner—Robert G. Nilson
Attorney, Agent, or Firm—Sughrue, Mion, Zinn, Macpeak and Seas

[57] ABSTRACT

A pressure-relief valve device has the stem of a valve member guided within a sealed bore of a guide piece screwed into or onto a sleeve-like housing. A spring in the housing acts on a pressure disk to create closure force on the head of the valve member. A connector, which may provide a plug-in connection to some equipment to be controlled, is in screw-threaded engagement with the guide and can be removed to provide ready access to the valve member without disturbing the remainder of the assembly and its setting. The valve member has a piston opposite the head which fits in a recess in the connector. An end wall of the recess forms a stop limiting the closed position of the valve and an end face of the guide forms a complementing stop face limiting the open position of the valve.

16 Claims, 2 Drawing Sheets

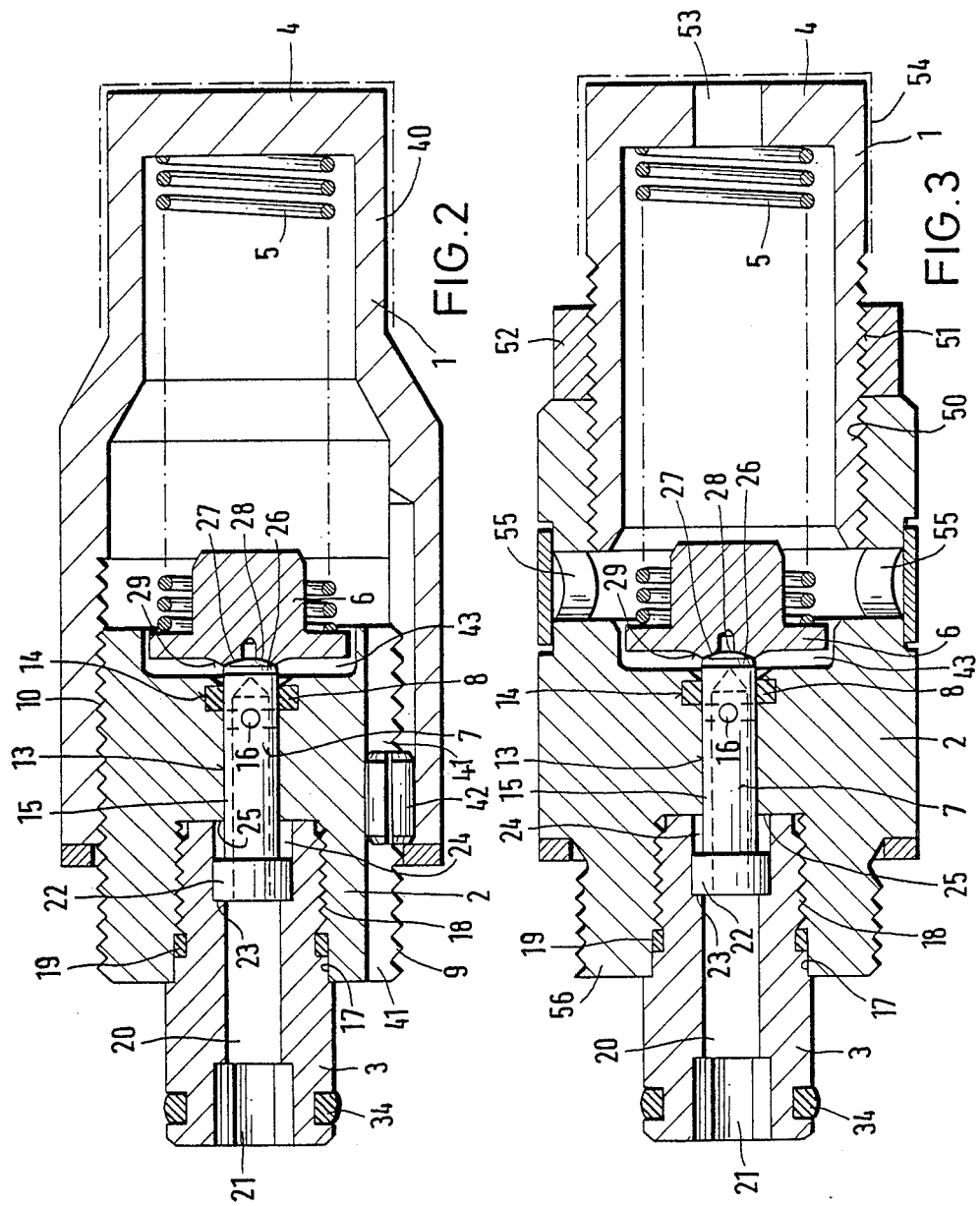

PRESSURE-RELIEF VALVE DEVICES

BACKGROUND TO THE INVENTION

1. FIELD OF THE INVENTION

The present invention relates to pressure-relief valve devices particularly for use with hydraulic mining equipment, such as props or rams.

2. DESCRIPTION OF PRIOR ART

Pressure-relief valve devices of various designs are widely used to protect mining equipment against excessive pressure and especially hydraulic props which are exposed to high forces by the roof of a mine working. Known devices are of small compact design and function to connect with a working chamber of the mine equipment so as to be exposed to the pressure fluid therein. Under normal conditions the valve of such a device remains closed but excessive pressure will cause the valve to open to permit pressure fluid to flow through the device and escape to relieve the excess pressure.

Valve devices of the aforementioned kind are usually embodied as cartridges with a hollow sleeve containing a spring and a guide screwed into the sleeve. A part-hollow valve member guided for displacement by an axial bore in the guide is exposed to the spring force to maintain closed a valve established between openings in a stem of the valve member and an O-ring seal. The spring force can be transferred to the valve member with the aid of a shaped disk or pressure piece and a connector part can serve to mount the device to the equipment to be protected. Examples of known devices are described in U.S. Pat. No. 4,284,101, German patent specification Nos. 3420890, 3245667, 3018145, 3508986; European patent specification No. 0096303 and in commonly assigned U.S. Pat. No. 4,716,928, the disclosure of which is herein incorporated by reference. In some prior art designs, where the connector is provided, this is either integral with the guide or not readily removable therefrom except upon wholesale disassembly of the valve device.

A general object of the invention is to provide an improved valve device.

SUMMARY OF THE INVENTION

A valve device constructed in accordance with the invention comprises a hollow sleeve providing a main housing; a guide having an axial bore; screw-threaded connection means between the guide and the housing; a valve member with a stem having a lower end and a head, the stem being slidably received in the axial bore of the guide; an axial blind bore in the stem which is open from the lower end of the stem to form fluid inlet means remote from the housing, radial bores leading to the periphery of the stem which communicate with the axial bore therein; sealing means between the periphery of the stem and the axial guide bore which co-operate with the radial bores to establish a valve between the fluid inlet means and the interior of the housing; a spring located in the housing to apply closure force to the head of the valve stem; a pressure member for transferring the closure force from the spring to the head of the valve member; and a connector for facilitating mounting the device to said mining equipment, the connector having a through bore serving to transfer pressure fluid to the lower end of the valve member. In accordance with the invention, means is provided for detachably connecting the connector to the guide for easy removal from the remainder of the device to permit the valve member to be withdrawn and released from the guide bore. A piston is also provided at the lower end of the valve member which locates in a recessed portion of the connector coaxial with the through bore and is confronted with opposed stop faces, delimiting the open and closed positions of the valve, formed by the recessed portion and by the guide.

In this improved design, the valve member can be easily withdrawn after the connector is detached. As is known, the affect of the closure force of the spring is controlled by relative adjustment between the housing and the guide. To facilitate this the housing can have a polygonal exterior at least over part of its length or a polygonal opening for accomodating a spanner or key respectively, to rotate the housing partially relative to the guide. Once the spring force has been adjusted in this manner the guide can be locked to the housing in a variety of ways discussed hereinafter.

The removal of the connector or the connector and the valve member need not disturb the set position of the guide and the housing. The connector can also have some polygonal configuration permitting adjustment vis a vis the guide to control the stop position of the valve member. The guide may possess an internal screw thread of larger diameter than the guide bore which receives an external threaded region of the connector. The connector can then be formed with a push-in nipple or the like. As is known from the aforementioned U.S. Pat. No. 4,716,928 the pressure member may have a central projection bearing on the head of the valve stem and a concave guide face merges the projection to a flange of the pressure member. In accordance with a further feature of the invention it is however desirable to further shape the projection to possess a socket which receives a convex head of the valve member stem. Preferably the housing or the guide have one or more outlets for relieved pressure fluid.

The invention may be understood more readily, and various other aspects and features of the invention may become apparent, from consideration of the following description.

BRIEF DESCRIPTION OF DRAWINGS

Embodiments of the invention will now be described, by way of example only, with reference to the accompanying drawings, wherein:

FIG. 2 is a longitudinal sectional elevation of another pressure-relief valve device constructed in accordance with the invention; and FIG. 3 is a longitudinal sectional elevation of a further pressure-relief valve device constructed in accordance with the invention.

DESCRIPTION OF PREFERRED EMBODIMENTS

Figure 1:
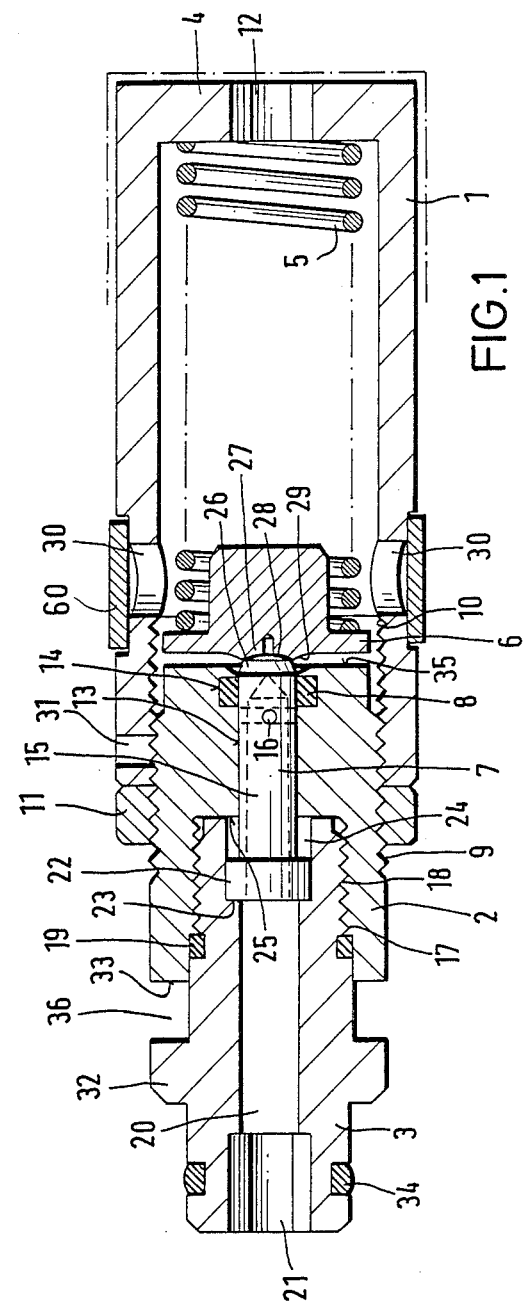
FIG. 1 is a longitudinal sectional elevation of a pressure-relief valve device constructed in accordance with the invention.

Throughout the accompanying drawings, the same reference numerals are used to denote similar parts and components. In all the illustrated embodiments, the pressure-relief valve device is of cartridge-like configuration with a hollow sleeve or housing 1 and a guide bush 2 fitted with screw-threaded engagement to the open end of the housing 1. A valve member 7 has a stem guided for sliding within the bush 2 and a piston 22 at its lower end. The valve member 7 has an axial blind bore penetrating the piston 22 and communicating with radial bores 16. An O-ring seal 8 engages and seals against the exterior of the stem of the valve member 7. A spring 5 is disposed in the housing 1 and acts via a pressure member 6 on the head of the valve member 7 to hold the outlets of the radial bores 16 below the seal 8. A connector 3 is fitted with screw-threaded engagement to the guide bush 2 and transfers pressure fluid for some equipment to the piston 22.

In the embodiment shown in FIG. 1, the bush 2 has an external screw thread 9 which engages with an internal screw thread 10 in the open end of the housing 1. A lock nut 11 is engaged with the thread 9 to secure the bush 2 in a set position. The housing has an end wall 4 opposite the bush 2 on which the spring 5 is supported. This wall 4 has an opening 12 of polygonal shape into which a key can be inserted to effect relative rotation between the housing 1 and the bush 2 to adjust the force exerted on the valve member 5 by the spring 5. The bush 2 has an axial guide bore 13 receiving the stem of the valve member 7 and a groove 14 in the wall of the bore 13 receives the O-ring 8. The bush 2 has an internal screw thread over a recessed portion 17 adjoining the bore 13 and the connector 3 is provided with an external screw thread 18 which engages with the internal screw thread in the portion 17. An O-ring seal 19 locates between the connector 3 and the bush 2. The connector 3 has a through bore 20 for permitting pressure fluid to act on the piston 22 of the valve member 7. The bore 20 has a polygonal opening 21 in which the key can be inserted to facilitate screwing in or out of the connector 3. At the opposite, inner, end, the connector 3 has a recess 24 coaxial with the bore 20 which provide a shoulder 23 which acts as a stop for the piston 22 in the closure direction of the valve under the spring force. The stroke of the valve member 7 in the closure direction can be adjusted by screwing the connector 3 in or out the guide. An end face 25 of the guide 2 forms a complementary stop, limiting the converse displacement of the valve member 7 and the open position of the valve. The stems of the valve member 7 has a constant diameter but is slightly convex at its upper free end to define a head 26.

The pressure member 6 has a lower flange which merge with a central projection 27 with a concave socket 28 receiving the convex head 26 of the valve member 7. An exterior annular concave surface merging the projection 27 and the flange serves to guide pressure fluid emerging from the outlets of the bores 16 when the fluid pressure raises the valve member 7 against the spring force. The main wall of the housing 1 has bores 30 permitting outflow of relieved pressure fluid and the bore 12 can also permit such outflow. A resilient band 60 of rubber or plastic overlies the bores 30 to prevent dirt from entering the valve. Its deformation permits outflow through the bores. An additional auxiliary bore 31 is provided on the threaded lower region of the wall of the housing 1. This bore 31 permits an adhesive, such as "LOCTITE" to be introduced to secure the screwed connection between the bush 2 and the housing 1 once the necessary adjustments have been made. The connector 3 also has a collar 32 which is opposite a lower end face 33 of the bush 2. A groove 36 is thus defined between the collar 32 and the face 33. The valve device can be plugged-in to some other equipment, such as a valve block, with the connector 3 and an O-ring 34 mounted to the end region of the valve device acts as a seal for pressure fluid accessible to the bore 20. The connector 3 is secured, as is known, by a U-shaped clamp fitted into the groove 36.

At least the bush 2 is provided with anti-corrosive protection, such as a metallic, e.g. nickel, coating which preferably also reduce friction between the valve member 7 and the bore 13.

During use, the pressure of the hydraulic fluid acts on the piston 22 which is held by the spring 5 in its closed position as shown. If the pressure rises beyond a predetermined level the piston 22 is raised against the force of the spring 5. Fluid in the space between the piston 22 and the end face of the bush 2 is forced out through a constricted passage formed for example by the gap between the piston 22 and the wall of the recess 24 and/or between the stem of the valve member 7 and the main bore 15. As soon as the outlets of the radial bores 16 pass the seal 8, the fluid in the bore 20 is allowed to flow into a chamber 35 between the pressure member 6 and the upper end face of the bush 2. The guide face 29 deflects the fluid radially to force it between the periphery of the flange of the member 6 and the housing 1. The fluid then escapes via the bores 30,12. As the valve first opens a back pressure is created in the chamber 35 which acts on the pressure member 6 to oppose the spring force and assist in opening the valve reliably. When the pressure falls, the spring 5 returns the valve member 7 to its closed position and the piston 22 engages on the stop 23. The piston 22 dampens out fluctuations in the displacement of the valve member while the valve is closing. With the connector 3 removed, the valve member 7 can be introduced through the threaded bore 17 into the bore 13 in the guide 2 or withdrawn. The guide 2 need not be detached in this operation and no alteration in the setting of the spring 5 need be made.

The valve device depicted in FIG. 2 differs essentially from the embodiment represented in FIG. 1 in that the pressure member 6 locates in a recess 43 in the end region of the guide 2. The bore 13 opens into the recess 43. The escaping pressure fluid is not vented to the surroundings but instead is routed back to a fluid return path and the bores 12,30 are hence omitted. The housing 1 is shaped over its exterior as a polygon, e.g. hexagon, to permit a spanner to effect the adjustment and the lower region of the housing 1 is enlarged relative to this polygonal region. The guide 2 has at least one longitudinal outflow passage 41 running along its outer periphery, and to secure the bush 2 against rotation a sleeve 42 is located in the passage 41 to fit in an axial groove in the inner wall of the housing 1. The same sized pressure member 6 can be used in both versions of the valve device shown in FIGS. 1 and 2.

The version of the valve device shown in FIG. 3 combines certain constructional features of the FIGS. 1 and 2 versions. In the FIG. 3 embodiment, the bush 2 has an interior screw-threaded bore 50 which receives an exterior screw threaded region 51 of the housing 1. A lock nut 52 secures the components 1,2 together. The end wall of the housing 1 is provided with a bore 53 while the associated end portion 54 of the housing 1 is provided with a polygonal, e.g. hexagonal, exterior for adjustment with a spanner. Additional outlet bores 55 are provided in the bush 2 in the region of the pressure member 6 which locates in the recess 43 in the bush 2. The guide 2 has an externally screw-threaded lower region 56 which can mate the device to the ancillary equipment.

I claim:

1. In a valve device for pressure relief of hydraulic pressure fluid used with mining equipment; said device comprising a hollow sleeve providing a main housing;
   a guide having an axial bore;
   screw-threaded connection means between the guide and the housing;
   a valve member with a stem having a lower end and a head opposite the lower end, the stem being slidably received in the axial bore of the guide; an axial blind bore in the stem which is open from the lower end of the stem to form fluid inlet means remote from the housing and radial bores leading to the periphery of the stem which communicate with the axial bore therein;
   sealing means between the periphery of the stem and the axial guide bore which cooperates with the radial bores to establish a valve between the fluid inlet means and the interior of the housing;
   a spring located in the housing to apply closure force to the head of the stem of the valve member;
   a pressure member for transferring the closure force from the spring to the head of the valve member;
   and a connector for facilitating mounting the device to said mining equipment, the connector having a through bore serving to transfer pressure fluid to the lower end of the valve member;
   the improvement comprising means for detachably connecting the connector to the guide for easy removal from the remainder of the device to permit the valve member to be withdrawn and released from the guide bore, a piston at the lower end of the valve member which locates in a recessed portion of the connector coaxial with the through bore and is confronted with opposed stop faces, delimiting the open and closed positions of the valve, formed by the recessed portion and by the guide, wherein the guide has an internally screw-threaded bore of larger diameter than the guide bore and the connector has an external screw-threaded region engaging within the screw-threaded bore of the guide.

2. A valve device according to claim 1, wherein the housing has one or more outlets for the relieved pressure fluid.

3. A valve device according to claim 1, wherein the connector has an opening with a polygonal shape at its free end remote from the guide.

4. A valve device according to claim 1, wherein the housing has an end wall opposite the guide against which the spring bears and the end wall has an opening therein of polygonal shape.

5. A valve device according to claim 1, wherein the housing has an end region remote from the guide which has a polygonal exterior.

6. A valve device according to claim 1, wherein the guide has a recess adjacent the pressure member and the pressure member locates in the recess.

7. A valve device according to claim 1, wherein the pressure member has a central projection engaging on the head of the valve member and a concave guide face merges the projection with a flange of the pressure member.

8. A valve device according to claim 7, wherein the projection is provided with a concave socket and the head of the valve member has a convex surface seating in the concave socket.

9. A valve device according to claim 1, wherein the connector is provided with a collar which co-operates with a lower face of the guide to define a groove for receiving clamping means to secure the device to the equipment.

10. A valve device according to claim 1, wherein the guide has a longitudinal passage constituting part of a fluid outlet path from the device.

11. A valve device according to claim 1, wherein the housing has an external screw-threaded region which engages in a screw-threaded socket of the guide.

12. A valve device according to claim 11 wherein the guide has one or more outlet bores for relieved pressure fluid.

13. A valve device according to claim 1, wherein the guide has an externally threaded lower region.

14. A valve device according to claim 1, wherein the guide is provided with a protective metallic coating.

15. In a valve device for pressure relief of hydraulic pressure fluid used with mining equipment; said device comprising a hollow sleeve providing a main housing;
   a guide having an axial bore;
   screw-threaded connection means between the guide and the housing;
   a valve member with a stem having a lower end and a head opposite the lower end, the stem being slidably received in the axial bore of the guide; an axial blind bore in the stem which is open from the lower end of the stem to form fluid inlet means remote from the housing and radial bores leading to the periphery of the stem which communicate with the axial bore therein;
   sealing means between the periphery of the stem and the axial guide bore which cooperates with the radial bores to establish a valve between the fluid inlet means and the interior of the housing;
   a spring located in the housing to apply closure force to the head of the stem of the valve member;
   a pressure member for transferring the closure force from the spring to the head of the valve member;
   and a connector for facilitating mounting the device to said mining equipment, the connector having a through bore serving to transfer pressure fluid to the lower end of the valve member;
   the improvement comprising means for detachably connecting the connector to the guide for easy removal from the remainder of the device to permit the valve member to be withdrawn and released from the guide bore, a piston at the lower end of the valve member which locates in a recessed portion of the connector coaxial with the through bore and is confronted with opposed stop faces, delimiting the open and closed positions of the valve, formed by the recessed portion and by the guide, wherein the connector has an opening with a polygonal shape at its free end remote from the guide.

16. A valve device according to claim 15, wherein the guide has an internally screw-threaded bore of larger diameter than the guide bore and the connector has an external screw-threaded region engaging within the screw-threaded bore of the guide.

* * * * *